Aug. 12, 1958  A. H. GERBAUD  2,847,592
MOTOR FOR INDUSTRIAL AND HOUSEHOLD SEWING MACHINES
Filed March 19, 1956  4 Sheets-Sheet 1
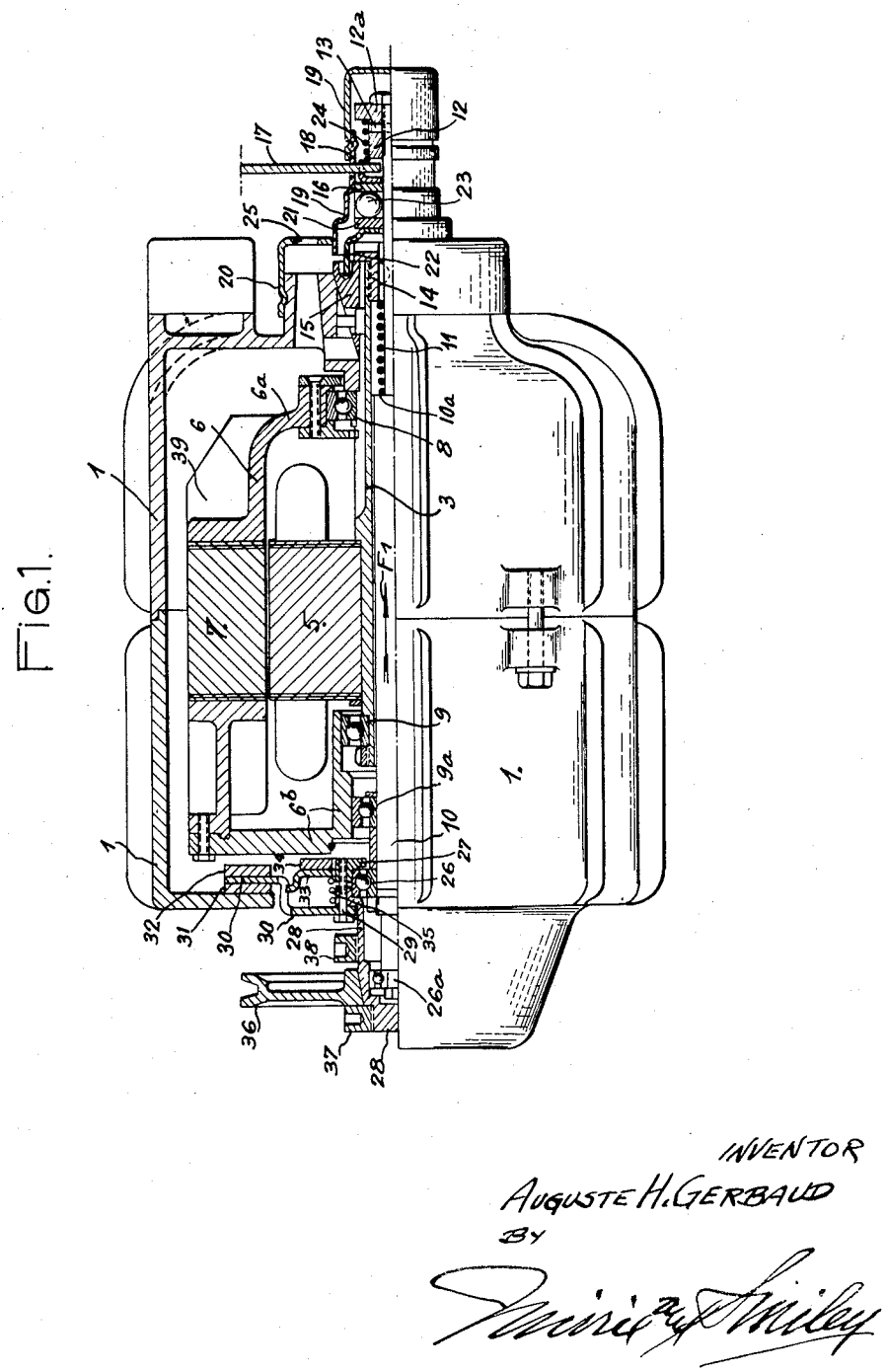
INVENTOR
AUGUSTE H. GERBAUD
BY

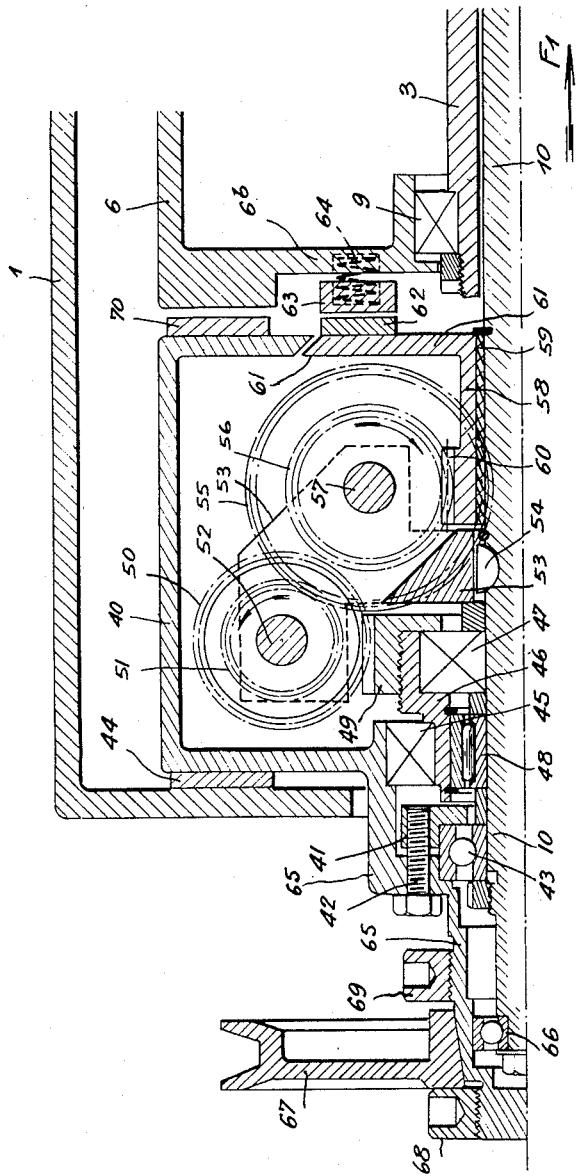

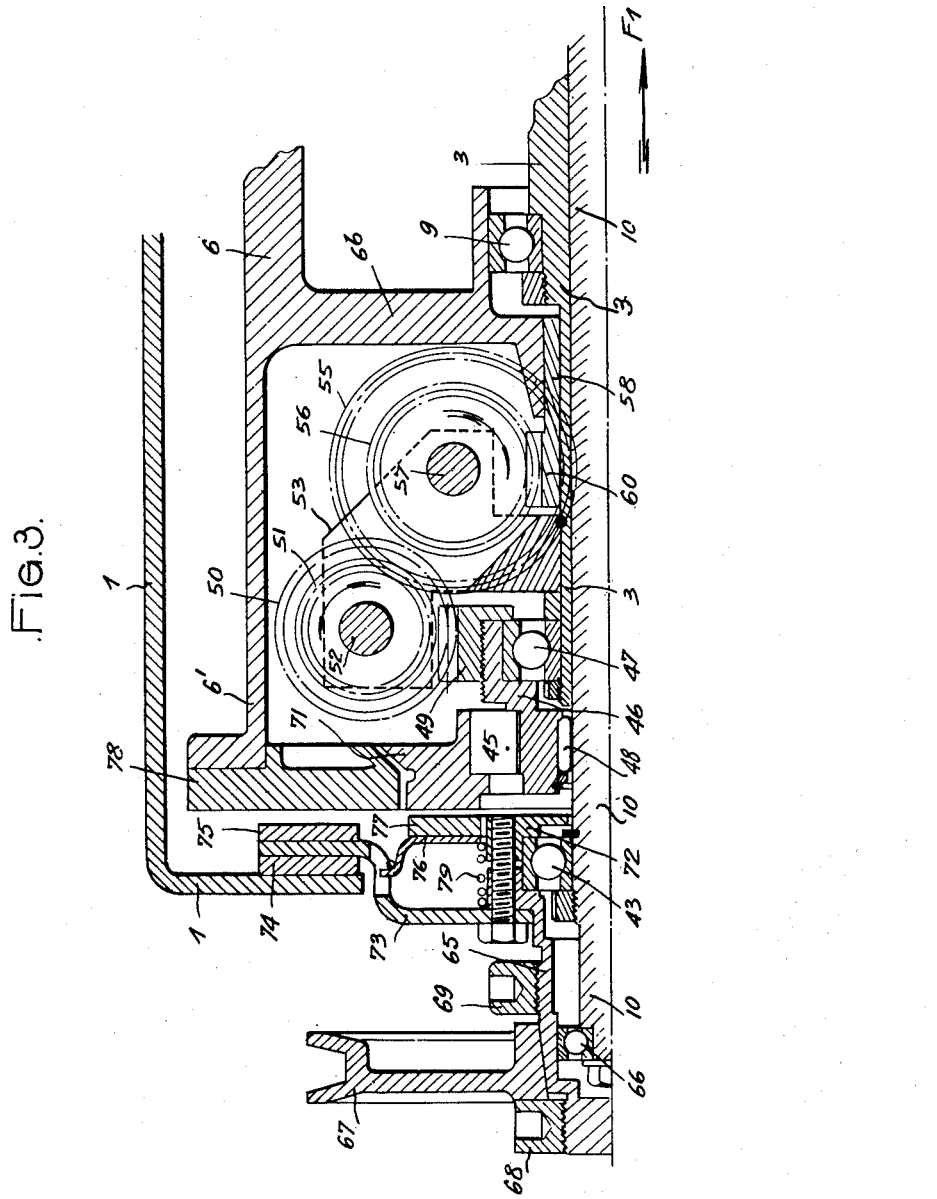

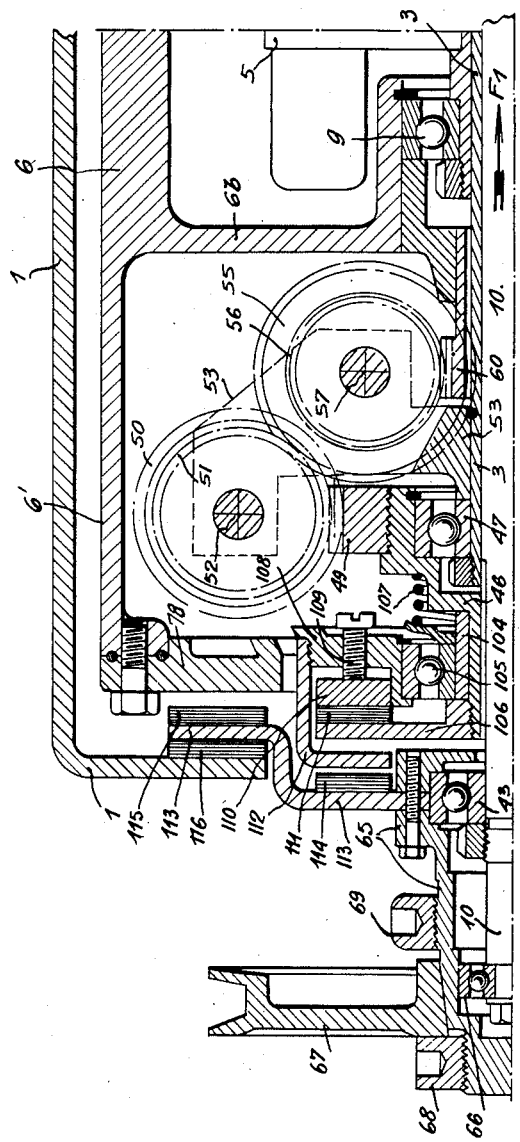

United States Patent Office 2,847,592
Patented Aug. 12, 1958

2,847,592
MOTOR FOR INDUSTRIAL AND HOUSEHOLD SEWING MACHINES

Auguste Henri Gerbaud, Paris, France

Application March 19, 1956, Serial No. 572,284

Claims priority, application France March 23, 1955

8 Claims. (Cl. 310—78)

This invention relates to a motor especially for use in industrial and household sewing machines and more particularly to a motor incorporating a transmission for delivering two different speeds of rotation whereby the sewing machine may be driven selectively at a standard sewing speed and at a slower speed for sewing stitch by stitch.

According to the invention, the motor drives a reducing-gear device and two clutches enabling the drive pulley to be driven selectively at low speed or at high speed.

Various other characteristics of the invention will moreover be revealed by the detailed description which follows.

Forms of embodiment of the purpose of the invention are shown, by way of example, in the attached drawings.

Figure 1 is a partial sectional elevation, of the driving motor for a sewing machine.

Figure 2 is a half-section of the reducing-gear device placed at one end of the motor.

Figure 3 is a half-section of an alternative embodiment of the reducing-gear device.

Figure 4 is a half-section of a third form of embodiment of the reducing-gear device.

In Figure 1, the motor comprises a casing 1 which preferably is adapted for mounting either on the sewing machine or under a table supporting the sewing machine. A stationary hollow shaft 3 within the casing 1 supports a stator 5. A rotor 6, including the usual electromagnet 7, is journaled on the hollow shaft 3 by ball bearings 8 and 9 respectively between the ends or spiders 6a and 6b of the rotor 6 and the hollow shaft 3. The end 6b may also be journaled on the shaft 10 by ball bearings 9a and this end may comprise a radial clutch disc as will be described hereinafter. A nonrotatable but axially movable arbor or shaft 10 is housed inside the hollow shaft 3 and has a reduced portion at one end which carries a threaded collar 12 fixed to it by a gudgeon pin 13. A flanged nut 14 is threaded into the adjacent end of the hollow shaft 3 in surrounding relation to the reduced end of the arbor or shaft 10 and locks a cone 15 on the hollow shaft, this nut 14 being located between the collar 12 and a shoulder 10a between the shaft 10 proper and its reduced end. A spring 11 is interposed between the shoulder 10a and the nut 14 and this spring 11 biases the shaft 10 in a direction opposite that of the arrow $F_1$ (Fig. 1).

A cam 16 mounted freely on the shaft 10 is integral with a lever 17 passing through an opening 18 formed in a cover 19 that is held by a hood 20 on the casing 1 of the motor. A second cam 21 is mounted freely on the shaft 10, but is fixed by an extension 22 to the cone 15. The extension 22 also bears on the nut 14 locking the hollow shaft 3. Balls 23 are interposed between and housed in cavities in the cams 16 and 21 and are retained therein by the cover 19, said cavities having cam surfaces for forcing the balls in a direction axially of the shaft 10 when the cam 16 is rotated by means of the lever 17. The collar 12 has a flange 12a and a spring 24 is interposed between said flange and the cam 16 to thrust the balls 23 against the cam 21. The hood 20 is mounted on the casing 1 and extends to the cover 19, this hood 20 being formed with apertures 25 which are provided with strainers filtering the air for cooling the motor, and the adjacent end of the rotor 6 is provided with fan blades 39 for circulating the air.

A set of ball bearings 26 is mounted on the opposite end of the shaft 10 and supports a crown wheel 27 and a coupling 28, which are rigidly connected by bolts 29. A plate 30 is fixed by the bolts 29 on the coupling 28; this plate carrying a brake element or lining 31 for cooperation with the adjacent end wall of the casing 1, a clutch element or lining 32 and a disc 33 carrying a clutch element or lining 34. The disc 33 has a limited axial movement relative to the plate 30 and is biased from said plate by a spring 35 interposed therebetween. The clutches 32 and 34 cooperate with the rotor clutch disc 6b. A pulley 36 is mounted on the coupling 28 and held on the latter by nuts 37, 38. The pulley 36 may be connected to the sewing machine or the like by a belt (not shown).

The motor operates as follows:

When the motor is supplied with current, the rotor 6 revolves at high speed around the hollow shaft 3. The clutches 32 and 34 being separated from the rotor disc 6b and the brake 31 is engaged with the casing 1 so that the coupling 28 is not driven and the pulley 36 is motionless. The sewing machine, connected to this pulley by a belt, is thus not driven.

If the lever 17 is rotated about the shaft 10, the cam 16 is rotated relative to the cam 21 and the cam surfaces of the cavities in the cam 21 force the balls 23 in an axial direction and they thrust the assembly formed by the cam 16, the nut 12 and the shaft 10 in the direction of the arrow $F_1$ (Fig. 1), compressing the spring 11. This sliding in the direction of the arrow $F_1$ of the shaft 10 has the effect of displacing the coupling 28 and plate 30, releasing the brake 31 from the casing 1 and engaging the clutch 34 with the rotor disc 6b. The coupling 28 is then rotatively driven, as well as the pulley 36. Upon continued movement of the lever 17, the shaft 10 moves still further in the direction of the arrow $F_1$ and the clutch 32 also engages the rotor disc 6b.

If the lever 17 is released, the latter returns to its initial position and the spring 11 thrusts the shaft 10 in a direction counter to the arrow $F_1$, the balls 23 again entering the cavities of the cam 16. The return movement of the shaft 10 disengages the clutches 32 and 34 from the rotor disc 6b and engages the brake 31 with the casing 1 of the motor, and thereby brakes and locks the coupling 28 and pulley 36.

In Fig. 2, the casing 1 of the motor is lengthened and the parts not shown are identical to the structure shown in Fig. 1. A drum 40 is integral with the pulley coupling 65 and is clamped by a ring 41 and bolts 42 on ball bearings 43 mounted on the shaft 10. This drum carries a brake 44 engageable with the casing 1 of the motor to brake the coupling 65 under the action of the spring 11 and the shaft 10. The drum 40 is also mounted on an overrunning clutch 45 centered around a collar 46 mounted on both ball bearings 47 and needle bearings 48, both said bearings being mounted on the shaft 10. The collar 46, which is threaded on its periphery, receives a toothed crown wheel 49 meshing with a screw 50 integral with a pinion 51. The screw 50 and the pinion 51 are mounted freely on a shaft 52 fixed on a bracket 53 keyed at 54 to the shaft 10. The pinion 51 engages with a pinion 55 integral with a screw 56. The pinion 55 and the screw 56 are mounted freely on a shaft 57 supported by the bracket 53.

A coupling 58 mounted freely on a ring 59 surrounding the shaft 10 has teeth 60 meshing with the screw 56. The coupling 58 includes a flange 61 carrying a clutch element 62 opposite a clutch element 63 resiliently supported by compression springs 64 to the rotor disc 6b. The coupling 65 is also journaled on ball bearings 66 on the shaft 10 and carries a driving pulley 67 locked on it by nuts 68, 69. The drum 40 also carries a clutch element 70 that is engageable with the rotor disc 6b.

The motor shown in Fig. 2 operates as follows:

When the motor is supplied with current, the rotor 6 revolves at high speed around the hollow shaft 3. The brake 44 is engaged with the casing 1 and the clutch elements 62—63 and 70—6b are disengaged so that the drum 40, coupling 65 and pulley 67 are stationary.

If the lever 17 is pulled, as described in the foregoing, the shaft 10 moves in the direction of the arrow $F_1$ (Fig. 2) and this initial sliding has the effect of disengaging the brake 44 and engaging the clutch 62 with the clutch 63 so that the rotation of the rotor 6 is imparted to the coupling 58, and, through the toothed crown wheels 60, 49, the reduction gearing 56, 55, 51 and 50, the overrunning clutch 45, the drum 40, the coupling 65 and, finally, to the pulley 67. Thus, a stitch-by-stitch action is obtained on the sewing machine as it is driven at low speed through the reducing gear formed by the toothed crown wheels and pinions.

Upon further movement of the lever 17, the sliding of the shaft 10 is greater, and the drum 40 is moved to engage the clutches 70—6b so that the drum 40 revolves in synchronism with the rotor 6 and thus the maximum rotation speed of the pulley 67 is obtained. The difference of speed between the reducing-gear device and the drum 40 is absorbed by the overrunning clutch 45. The normal speed of the sewing machine is thus obtained.

When the pull exerted on the lever 17 is released, the latter resumes its idle position and the spring 11 thrusts the shaft 10 in the opposite direction to that of the arrow $F_1$ (Fig. 2) so that the clutches 62—63 and 70—6b are disengaged and the brake 44 engages the casing 1 of the motor, stopping rotation of the drum 40 and the pulley 67 so that the sewing machine is stopped.

In Fig. 3, the same elements of Fig. 2 bear the same reference numerals.

The rotor 6 has an extension 6' that entirely covers the reducing-gear device formed by the toothed crown wheels 49 and 60 and the train of gearing 50, 51, 55, 56. The overrunning clutch 45 supports a crown wheel 71, whereas the ball bearings 43 support the coupling 65, a ring 72 bolted to the coupling 65. A plate 73, also secured by the bolts with the coupling 65, carries a brake element 74 cooperative with the casing 1 and a clutch element 75 cooperative with a mating element 78 on the rotor extension 6'. The plate 73 slidably supports a disc 76 carrying a clutch element 77 and which is biased by a spring 79 toward the crown wheel 71.

When the shaft 10 is moved in the direction of the arrow $F_1$ and the rotor 6 revolves the slow rotation movement, which is normally transmitted to the crown wheel 71 through the reducing-gear device, is communicated, by the clutch 77 and the discs 76 and 73, to the coupling 65 carrying the driving pulley 67, because the clutch 77 first engages the crown wheel 71 owing to the fact that it is offset toward the rotor with respect to the packing 75. As in the preceding case, the initial crosswise movement of the shaft 10 in the direction of the arrow $F_1$ disengages the brake lining 74 from the casing 1 of the motor.

If movement of the shaft 10 in the direction of the arrow $F_1$ is continued, the clutch 75 engages the rotor clutch 78 which revolves at high speed and thus the pulley 67 is driven in synchronism with the rotor 6. In this latter case, the pressure exerted by the crown wheel 71 against the clutch 77 has the effect of thrusting the disc 76 against the spring 79 between the plate 76 and the disc 73. The rotation speed between the crown wheel 71 and the rotor clutch 78 is compensated by the overrunning clutch 45.

As soon as the shaft 10 reverts toward its normal position under the action of the spring 11, it slides in the opposite direction to the arrow $F_1$ (Fig. 3) and the clutch 75 disengages from the rotor clutch 78; again, the pulley 67 is driven at low speed, the spring 79 thrusting the disc 76 and the clutch 77 against the crown wheel 71.

If the shaft reverts to its normal position shown in Fig. 3, the clutch 77 is disengaged from the crown wheel 71 and the brake 74 comes into contact with the casing 1 of the motor, which has the effect of braking the plate 73, and at the same time, the sewing machine, by means of the coupling 65 and the pulley 67.

In Fig. 4, the same elements as in Figs. 2 and 3 bear the same reference numerals.

A sleeve 104 around the coupling 46 slidably supports ball bearings 105 thrust against a flange 106 on the coupling 46 by a spring 107. A ring 108 on the ball bearings 105 supports, by degrees, bolts 109 to whose ends a clutch annulus 110 is fixed, co-operating with a clutch 111 on the flange 106. An annular cup 112 is rigidly supported by the ring 108 in surrounding relation to the flange 106 and clutch 110—111. The coupling 65 carries a disc 113 supporting a clutch element 114 for cooperation with the cup 112 and brake and clutch elements 116 and 115 respectively cooperative with the casing 1 and the rotor clutch 78.

When the shaft 10 is moved in the direction of the arrow $F_1$ and the rotor 6 revolves at high speed, the clutch 114 comes into contact with the cup 112 which is driven at low speed by means of the crown wheel 110, the flange 106 of the coupling 46 and the reducing-gear device. Thus the pulley 67 is driven at low speed, and the sewing machine operates stitch by stitch.

If movement of the shaft 10 in the direction of the arrow is continued $F_1$, the clutch 114 thrusts the cup 112 and the ring 108 as well as the ball bearings 105 against the action of the spring 107 along the sleeve 104, disengaging the annulus 110 from the clutch 111. In addition, the clutch 115 is engaged with the rotor clutch 78. The coupling 65 is then driven at high speed with the pulley 67. Owing to the disengagement of the clutch 111 from the annulus 110, the reducing gear idles.

If the shaft 10 is moved in the opposite direction to the arrow $F_1$, a stitch-by-stitch action is again obtained because the spring 107 thrusts the ball bearings 105, the ring 108 and the annulus 110 against the clutch 111.

When the shaft 10 is returned to the normal position shown in Fig. 4, the brake lining 116 is in contact with the casing 1 of the motor; the rotor 6 is freed and the clutch 114 no longer bears against the cup 112. The pulley 67 is braked, which stops the sewing machine.

In the foregoing, reference has always been made to a sewing machine, but the motor described could also drive similar machines, such as embroidery, decorating, etc., machines.

In certain cases, the reducing-gear device shown in Figs. 2, 3, 4 could be employed in motors comprising a device that automatically positions the needle of the sewing machine, either at its high dead centre or its low dead centre.

I claim:

1. An electric power unit comprising a casing, a hollow shaft fixed at one end in said casing, a second shaft slidably mounted within said hollow shaft to move between two extreme positions, a stator on said hollow shaft, a rotor surrounding said stator and journaled on said hollow shaft, clutch means on said rotor, brake means on said casing, drive means journaled on said second shaft in axially fixed relation thereto and extending beyond said casing for connection with a driven member, a carrier connected with said drive means and disposed within said casing between said rotor clutch means and said casing brake means, brake means on said carrier cooperative with said casing brake means when said second shaft is at one extreme position to hold said drive means stationary, clutch means on said carrier for cooperation with said rotor clutch means when said second shaft is slid axially to its other extreme position to drive said drive means in synchronism with said rotor, and reduction gear means in said casing in driving relation between said rotor and said drive means, said reduction gear means including clutch means that is operative at an intermediate position of said second shaft to drive said drive means at a lower speed and is inoperative at the extreme positions of said second shaft.

2. An electric power unit according to claim 1, wherein said reduction gear clutch means comprises a pair of cooperative clutch elements, one of which is resiliently supported and engageable with the other element at the intermediate position of said second shaft and accommodates the addition movement of said second shaft to its extreme position in which the carrier and rotor clutch means are engaged.

3. An electric power unit according to claim 2 wherein said reduction gear clutch means includes an overrunning clutch to render said reduction gear drive inoperative when said carrier and rotor clutch means are engaged.

4. An electric power unit according to claim 2 wherein said reduction gear clutch means includes two pairs of clutch elements, one element of each pair being jointly mounted on a common rotatable support independent of said reduction gear means, the other element of one pair being in constant driving relation with said reduction gear means, and spring means biasing said common support to move the clutch elements carried thereby toward their cooperative elements and normally engage the elements of said one pair to transmit a low-speed drive upon engagement of the other pair but permit disengagement of said one pair upon the additional movement of said second shaft to engage the carrier and rotor clutch means.

5. An electric power unit according to claim 1 wherein said reduction gear means comprises a drive gear journaled on said second shaft and axially fixed therewith, a bracket mounted on said second shaft and axially fixed therewith, a driven gear journaled on said second shaft and axially fixed therewith, and a reduction gear train journaled in said bracket and meshing with said drive and driven gears, said reduction gear clutch means including a clutch element on said drive gear and a cooperative clutch element on said rotor for engagement prior to engagement of said rotor clutch means with said carrier clutch means, one of said clutch elements being resiliently supported to accommodate the additional axial movement for engaging said clutch means, and an overrunning clutch between said driven gear and said carrier to drive said drive means at low speed and permit said drive means to be driven at high speed synchronously with said rotor upon engagement of said clutch means.

6. An electric power unit according to claim 1 wherein said reduction gear means comprises a drive gear on said rotor, a bracket on said hollow shaft, a driven gear journaled on said hollow shaft, and a reduction gear train journaled in said bracket and in mesh with said drive and driven gears, said reduction gear clutch means including an overrunning clutch driven by said driven gear, a clutch element driven by said overrunning clutch, and a cooperative clutch element on said carrier, one of said latter clutch elements being resiliently supported to effect engagement of said elements prior to engagement of said carrier and rotor clutch means but accommodate the additional axial movement to engage said clutch means.

7. An electric power unit according to claim 1 wherein said reduction gear means comprises a drive gear on said rotor, a bracket on said hollow shaft, a driven gear journaled on said hollow shaft, and a reduction gear train journaled in said bracket and in mesh with said drive and driven gears, said reduction gear clutch means including a sleeve fixed with said driven gear and carrying a clutch element, an annular support slidably journaled on said sleeve, an annular clutch element on said support for cooperation with said sleeve clutch element, spring means biasing said support and normally retaining said clutch elements in engagement, a second clutch element on said support, and a clutch element on said carrier for cooperation with said second clutch element, said second and carrier elements being spaced less than said carrier and rotor clutch means to be initially engaged to drive said drive means at slow speed and to move said support to disengage said sleeve element and annular element upon the additional movement to engage said clutch means.

8. An electric power unit comprising a casing, brake means on one end of said casing, a stator in said casing, a rotor journaled in said casing in cooperative relation with said stator, clutch means on the end of said rotor adjacent said brake means, drive means journaled in said casing at the end of said casing supporting said brake means and extending beyond said casing for connection with a driven member, a carrier drivingly connected with said drive means and disposed within said casing between said rotor clutch means and said casing brake means, said carrier being movably supported for axial movement between two extreme positions, brake means on said carrier cooperative with said casing brake means when said carrier is at one extreme position to hold said drive means stationary, clutch means on said carrier for cooperation with said rotor clutch means when said carrier is moved axially to its other extreme position to drive said drive means in synchronism with said rotor, and reduction gear means in said casing in driving relation between said rotor and said carrire, said reduction gear means including clutch means that is operative at an intermediate position of said carrier to drive said drive means at a lower speed and is inoperative at the extreme positions of said carrier.

References Cited in the file of this patent
UNITED STATES PATENTS

| 1,663,607 | Naul | Mar. 27, 1928 |
| 2,485,623 | McNairy | Oct. 25, 1949 |